United States Patent [19]

Karnowski

[11] Patent Number: 5,526,424
[45] Date of Patent: Jun. 11, 1996

[54] ELECTRONIC NOTEPAD

[75] Inventor: Mark Karnowski, Garden Grove, Calif.

[73] Assignee: Casio PhoneMate, Inc., Torrance, Calif.

[21] Appl. No.: 415,162

[22] Filed: Mar. 31, 1995

Related U.S. Application Data

[60] Continuation of Ser. No. 234,592, Apr. 28, 1994, abandoned, which is a division of Ser. No. 138,619, Oct. 18, 1993, abandoned, which is a continuation of Ser. No. 590,352, Sep. 28, 1990, abandoned.

[51] Int. Cl.$^6$ .............................. H04M 1/64; H04M 1/00
[52] U.S. Cl. ............................ 379/355; 379/354; 379/88; 379/89
[58] Field of Search ................................. 379/67, 88, 89, 379/354, 355, 356, 357, 61, 70, 79, 68, 85

[56] References Cited

U.S. PATENT DOCUMENTS

| | | | |
|---|---|---|---|
| 4,304,968 | 12/1981 | Klausner et al. | 379/355 |
| 4,456,925 | 6/1984 | Skerlos et al. | 379/355 |
| 4,490,579 | 12/1984 | Godoshian | 379/354 |
| 4,588,863 | 5/1986 | Ress | 379/355 |
| 4,709,387 | 11/1987 | Masuda | 379/355 |
| 4,720,855 | 1/1988 | Ohnishi et al. | 379/355 |
| 4,800,582 | 1/1989 | D'Agosto, III et al. | 379/355 |
| 4,852,146 | 7/1989 | Hathcock et al. | 379/355 |
| 4,860,339 | 8/1989 | D'Agosto, III et al. | 379/355 |
| 4,881,259 | 11/1989 | Scordato | 379/61 |
| 4,980,910 | 12/1990 | Oba et al. | 379/354 |
| 4,985,918 | 1/1991 | Tanaka et al. | 379/356 |
| 5,111,500 | 5/1992 | Afshar et al. | 379/67 |

FOREIGN PATENT DOCUMENTS 0181552  7/1988  Japan .................................. 379/355

OTHER PUBLICATIONS

The article "A Voice Activated Telephone" IEEE Transactions on Consumer Electronics, vol. CE–32, No. 3, Aug. 1986.

*Primary Examiner*—Jason Chan
*Attorney, Agent, or Firm*—Frishauf, Holtz, Goodman, Langer & Chick

[57] ABSTRACT

An electronic notepad associated with the entry, and storage, dialing of telephone numbers is disclosed. The telephone numbers are entered through a telephone touch pad and is displayed on a liquid crystal display. Attached to a stand alone telephone or a telephone answering device (also know as a TAD), telephone numbers which would otherwise be easily forgotten due to transient presentation are retained by the device for later retrieval or use.

12 Claims, 6 Drawing Sheets

ELECTRONIC NOTEPAD

This application is a Continuation of application Ser. No. 08/234,592, filed Apr. 28, 1994 (now abandoned), which is a Divisional of Ser. No. 08/138,619, filed Oct. 18, 1993 (now abandoned), which is a Continuation of Ser. No. 07/590,352, filed Sep. 28, 1990 (now abandoned).

BACKGROUND

1. Field of the Invention

This invention relates to peripheral devices for use with telephones and more particularly to a device that semi-permanently stores and retrieves telephone numbers.

2. Description of the Prior Art

Generally, a notepad and pen or pencil are used to write down numbers as they are given over the telephone from information services, delivered by an answering machine, as seen on a television, or heard on the radio. The problem with this means of recording phone numbers is that pen and paper are not always available. This is especially true when numbers are given to a caller over a pay phone. Pen and paper may not be found and human memory must suffice as the means by which the number is retained. Human memory is flawed and can easily transpose or forget numbers.

Iggulden, U.S. Pat. No. 4,933,968, issued Jun. 12, 1990, discloses a device that recognizes and records telephone numbers given by a computer generated voice synthesizer such as those numbers given by "411" information services of many telephone utilities. The recognized number from the information service is stored and then redialed by an automatic redialing feature of the telephone. The Iggulden device is inherently limited as it does not recognize normal human speech and is inhibited by noise over the telephone line. Further, the user can not directly input any other telephone number, but is restricted to voice synthesized numbers only.

In Helferich, U.S. Pat. No. 4,905,003 issued Feb. 27, 1990, the recording and playback of voice messages is made via analog/digital conversion. The Helferich device stores voice, and not number or digital, signals and converts them for digital storage. Number signals are not intended for storage by Helferich. Neither does Helferich store signals for playback in order to dial a telephone.

Mitsubishi International Corporation currently manufactures cellular phones having a "Silent Scratch Pad" feature. One such cellular phone is the model 600. This Silent Scratch Pad feature allows the user to enter a phone number, while currently on the phone, into memory for subsequent dialing. This Silent Scratch Pad feature is a minor extension of the normal dialing system of the cellular phone itself. The normal dialing sequence of the model 600 has the caller enter the number to be called into the cellular phone where it must, by necessity, be stored in memory as the number is not dialed immediately upon keypad entry. The caller must then execute the call by pressing a "send" button which then dials the number to be called. When the numbers are pressed for dialing a telephone number from the cellular phone, a tone or beep is emitted to inform the caller that a number has been pressed. The Silent Scratch Pad feature merely suppresses the tone/beep.

While the caller is engaged in a phone call on the model 600, he or she may be given a phone number from the caller. This is especially true when "411 information" is dialed. Upon reception of the number, the caller can then silence the tone/beep and press the buttons corresponding to the number given. This new number is then stored in the memory buffer for the outgoing telephone call. The old number need not be used as the call has been established and the memory which stored the old number can be used to store a new number.

A drawback present with this system is that the phone number entered into the Silent Scratch Pad must necessarily be dialed as the very next phone call as there is no other memory for the number and if another call is made, the number saved is flushed from the memory that must be used in order to dial any number from the phone.

Accordingly, there is a need for a device that allows the semi-permanent retention of phone numbers that is connected to a phone so that the phone may dial the retained number. Further, such a retention device is needed that does not interfere with or monopolize the operation of the phone. Also a device is needed that can be controlled by the caller, with entry and use at the sole discretion of the caller.

SUMMARY OF THE INVENTION

The present invention consists of an interactive storage device associated with a telephone apparatus that allows the user to temporarily enter telephone numbers into the storage device by use of the telephone keypad. The number entered is displayed to the user on a screen such as an LCD. The number that has been entered into the storage device can then be transferred to an automatic telephone dialer so that the user may call the stored number.

OBJECTS OF THE INVENTION

Accordingly, it is an object of the present invention to provide storage and retrieval means for telephone numbers and like information.

It is also an object of the present invention to provide telephone number storage and retrieval means that can be connected to other telephone-related equipment, such as telephone answering devices.

It is another object of the present invention to provide telephone number storage and retrieval means that permits automatic dialing of the stored telephone number.

It is still another an object of the present invention to display the number that is stored in the telephone number storage and retrieval means.

It is yet another object of the present invention to provide telephone number storage and retrieval means that is inexpensive and easy to use.

These and other objects of the present invention will become apparent from a review of the following specification and accompanying drawings.

DETAILED DESCRIPTION OF THE PREFERRED EMBODIMENTS

The invention disclosed herein is referred to throughout as an "electronic notepad", or "ENP" as the invention serves to temporarily record for later execution a telephone number or like information.

Figure 1:
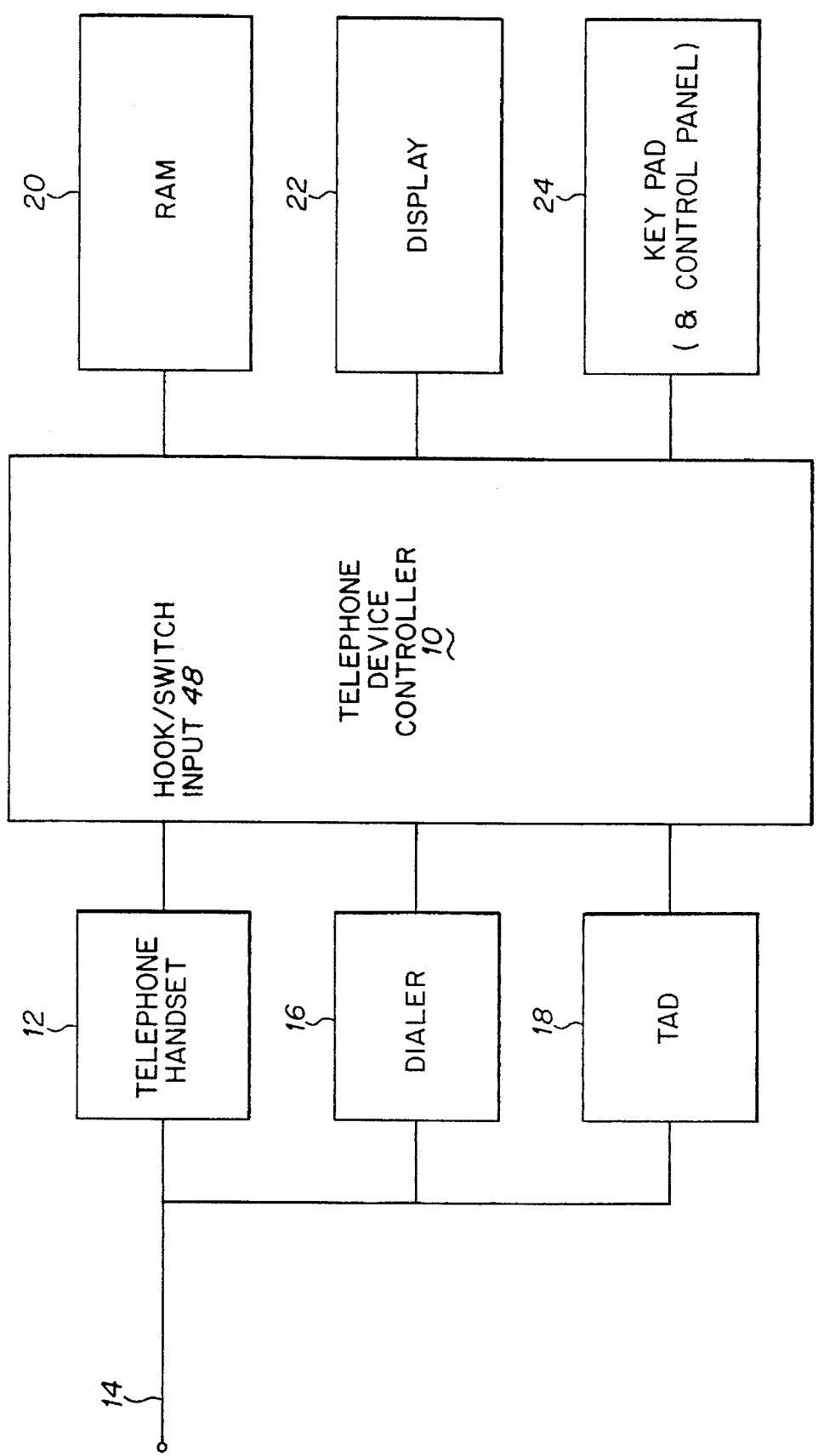
FIG. 1 is a schematic diagram portraying the present invention as connected to telephone-related equipment.
Figure 2:
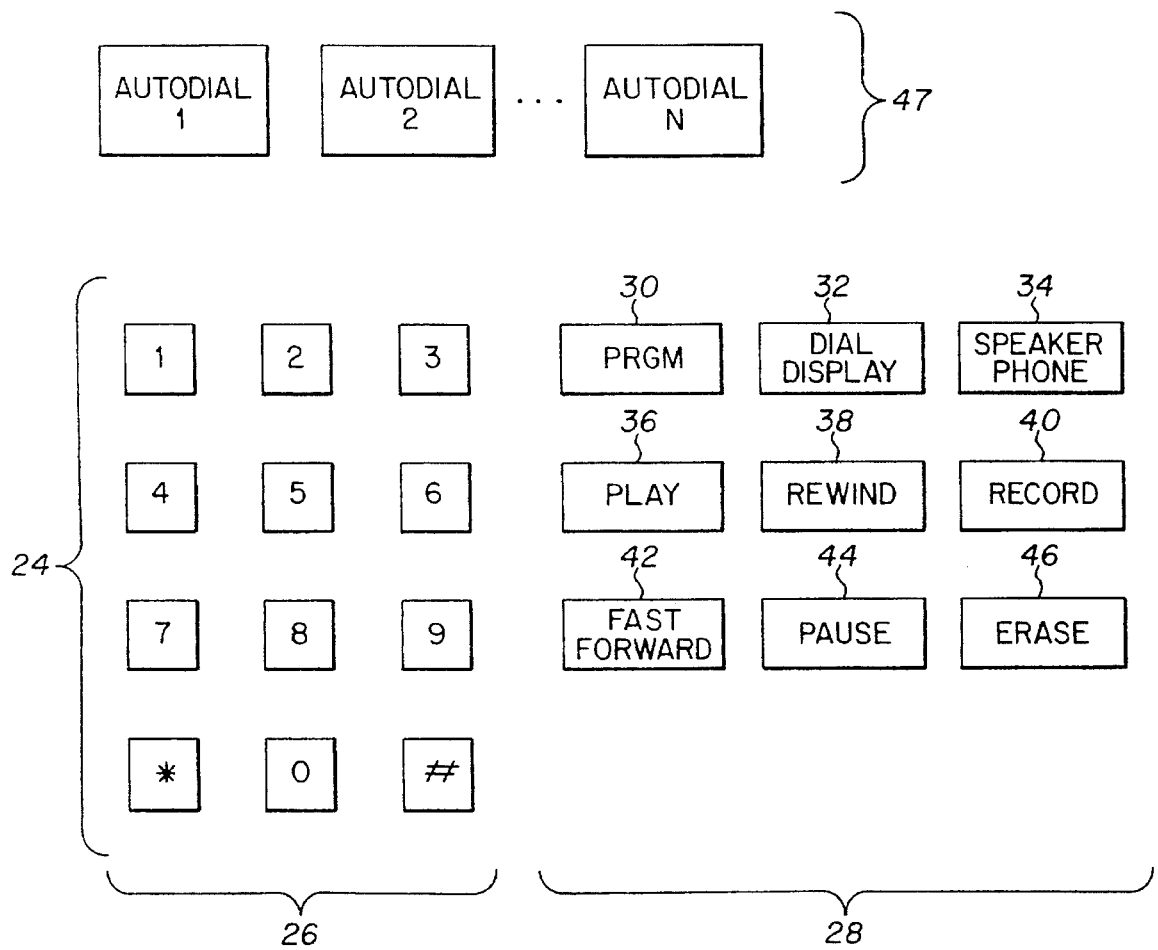
FIG. 2 is a top diagrammatic view of a keypad of the present invention showing numeric and control sub-keypads.

Referring to FIG. 1, the system may preferably be used in association with the telephone device as shown. Other configurations are possible, such as the addition of a FAX machine or computer modem to the telephone device, but the telephone device of FIG. 1 suffices for present purposes. A telephone device controller 10 is connected to a telephone handset 12 which in turn is connected to the telephone line 14. The telephone device controller 10 may be a microprocessor of appropriate capacities. The telephone device controller 10 is also connected to an automatic telephone dialer 16 and a telephone answering device (TAD) 18. The telephone device controller 10 is also connected to a source of random access memory (RAM) 20 for the ENP, as well as a display panel 22 and a keypad 24 for telephone number entry and microprocessor control. The keypad 24 of FIG. 2 has the number keys 26 normally found for push button phones, plus additional control keys 28 for control of the telephone device. The control keys 28 for the telephone device include PROGRAM 30 and DIAL DISPLAY 32 keys, an optional speaker phone key 34, as well as PLAY 36, REWIND 38, RECORD 40, FAST FORWARD 42, PAUSE 44, and ERASE 46 keys. Auto-dialer keys 47 may also be present to store telephone numbers for later retrieval and dialing.

The telephone device controller 10 controls the operation of the TAD 18, the telephone dialer 16, the ENP RAM 20, and the visual display 22. The telephone device controller 10 monitors the telephone handset 12 via a hook/switch input 48 to the telephone device controller 10. Individual numbers of a telephone number or commands are entered by pressing the appropriate buttons, 26 or 28 respectively, on the keypad 24. The telephone device controller 10 continually scans the keypad 24 to detect the presence 0f numbers for input or commands to be executed. Depending on the keypad input, the telephone device controller 10 responds accordingly by executing the command or by processing the number.

Upon power-up, the telephone device controller 10 continually scans its inputs for activity. When a user picks up the telephone handset 12 in order to use the telephone, the telephone device controller 10 enables the dialer 16 and begins scanning the output of the keypad 24 for numbers 26 or commands 28. When numbers, such as a telephone number, is entered, the telephone device controller 10 sends the numbers to the automatic dialer 16 for dialing. The telephone device controller 10 also sends the numbers to the visual display 22, such as a liquid crystal display (LCD), so that they are seen by the user.

When the PROGRAM key 30 is pressed, the command is detected by the telephone device controller 10 and the dialer 16 is disabled. Number buttons 26 pressed following the PROGRAM key 30 are sent to the ENP RAM 20 for storage and to the visual display 22 for viewing. The number is stored in ENP RAM 20 until the DIAL DISPLAY key 32 is pressed. Upon detection of a DIAL DISPLAY command, the telephone device controller 10 executes the command by enabling the dialer 16 and sending the number stored in ENP RAM 20 and shown on the visual display 22 to the dialer 16. The dialer 16 then automatically dials the number.

Alternatively, the auto-dialer keys 47 may be used to save the number in auto-dialer storage. Once the number has been entered into the ENP as above, pressing an auto-dialer key saves the number in ENP RAM 20 in the auto-dialer storage location for that key. Upon pressing that key, the number saved is then automatically dialed.

Commands controlling the status of the TAD 18 are entered by means of the control keys 28 to the telephone device controller 10 which then executes the chosen TAD command. When the TAD 18 is in playback mode, initiated by pressing the PLAY button 36, the telephone device controller 10 scans the keypad 24 for number/command entry. When a number 26 is pressed, the telephone device controller 10 automatically stores the number in ENP RAM 20 and sends it to the visual display 22. As the TAD 18 is in playback mode, the number is not dialed as the functions of playing back of recorded messages while talking on the telephone are in conflict and demand simultaneously different functions from the telephone device controller 10. To this extent, dialing is disabled while the TAD 18 is playing back messages and the number keyed in is stored in ENP RAM 20 and displayed by the visual display 22. When the PAUSE command is chosen by the user by pressing the PAUSE key 44, the telephone device controller 10 detects the command and implements it by signalling the TAD 18 to stop playing messages. By picking up the telephone handset 12, or by pressing the speaker phone key, the user is connected to the phone line 14. Once connected to the phone line 14, the user can press the DIAL DISPLAY key 32 to have the stored number dialed in order to make a call. Once the user has completed his call, he hangs up the phone and may then press the PAUSE key 44 to continue to listen to his remaining messages. Upon receiving a second PAUSE command, the telephone device controller 10 instructs the TAD 18 to continue playing back the user's messages.

It can be seen that the ENP disclosed herein arises from the structure of several components working together. Four components lie at the core of the ENP: memory for telephone number storage, a visual display (and/or voice synthesizer for aural presentation) for the number stored in the memory, means by which telephone keypad entries may be sent to the memory, and means for dialing the number so stored. The means by which a number is stored for dialing soon thereafter frees the user from having to scramble after pen and paper when inconvenient or unavailable and also provides a convenient method by which numbers may be stored for dialing soon thereafter. Further, the ENP resides electronically outside of the main signal stream of the telephone (the dialing of numbers and transfer of voice signals) so that information stored in the ENP is preserved from phone call to phone call until it is cleared intentionally or possibly saved in more permanent memory storage such as an auto-dial memory location. Auto-dial memory locations are used in conjunction with auto-dialer keys 47. An ENP may be used in conjunction with a telephone in the preferred embodiment, or alternatively with a television whereby numbers are entered from a remote control unit for the television for later television display.

There are three modes in which the ENP operates: IDLE, TALK, and PLAY modes. In IDLE mode, the user may enter a number even though he is not on the phone or playing back messages. In TALK mode, the user may enter information while using the telephone handset 12. In PLAY mode, the user can enter a number while listening to incoming messages on a TAD 18.

Figure 3:
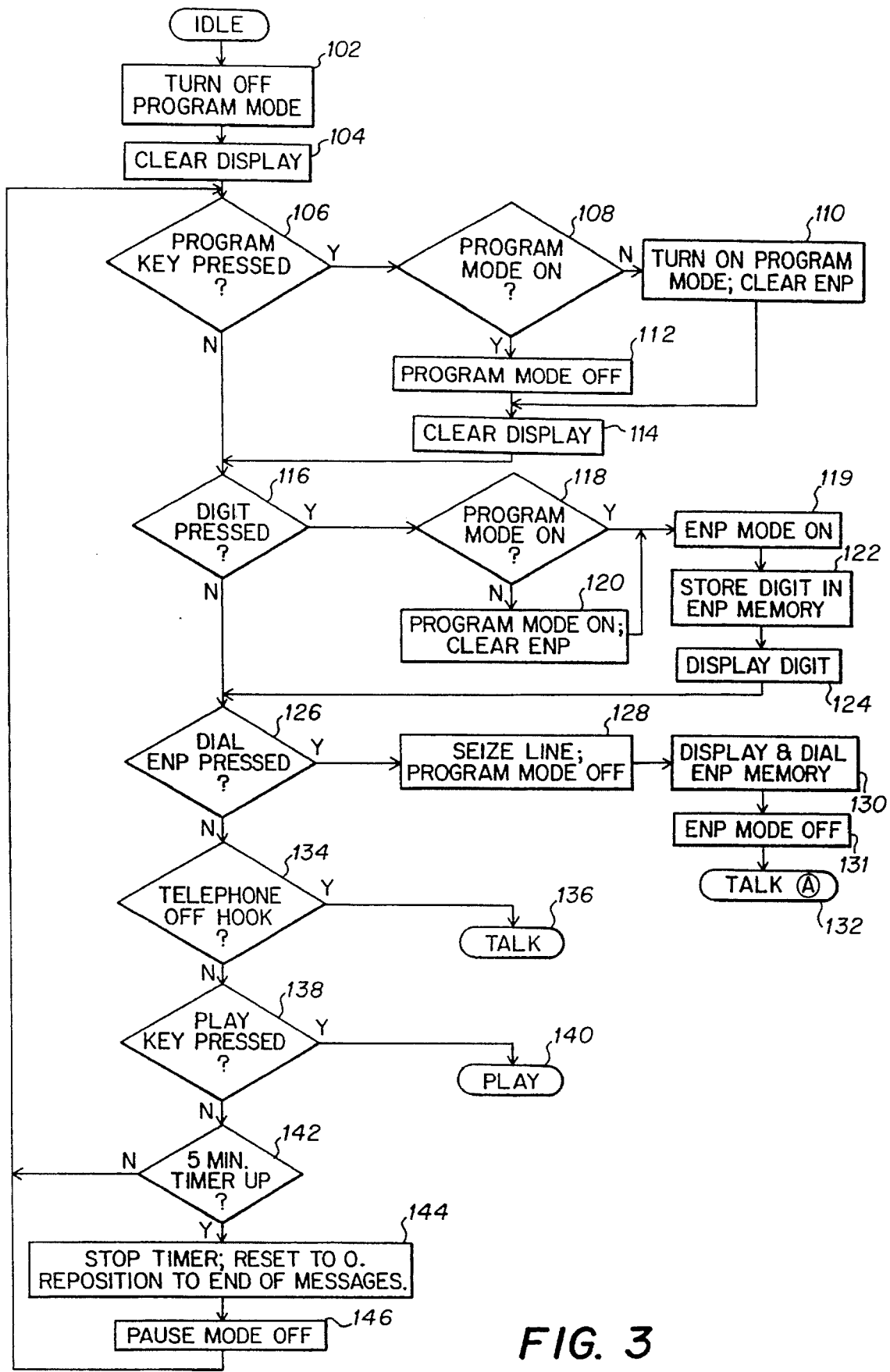
FIG. 3 is a flow chart portraying the function of the present invention when initially in IDLE mode.

The IDLE mode, FIG. 3, is the default mode of the ENP and is maintained when no other mode is enabled.

After initiation, the IDLE mode begins its programmed cycle, by turning off the PROGRAM mode 102 and clearing the visual display 22, 104. The telephone device controller 10 then cyclically checks its inputs for some user action such as the entry of a number or a command.

When a user input is detected, it may be one of several choices. Each choice triggers certain subsequent actions. If the input to the telephone device controller 10 is the PROGRAM command 106, the PROGRAM mode is toggled (turned off if on, and on if off), 108–112, the ENP RAM 20 is cleared 110 if the PROGRAM mode was off, and the display 22 is cleared 114.

If the input is a number 116, the status of the ENP is checked to ensure that the PROGRAM mode is on 118. If the PROGRAM mode is off, it is turned on and the ENP RAM 20 is cleared 120 as no off hook signal has yet been detected and a number would only be pushed in order to store it in the ENP. The ENP mode is then turned on 119. When the ENP mode is turned on, the contents of the ENP RAM 20 will be displayed on the visual display 22 when the telephone is off-hook. The number is then stored in the ENP RAM 20, 122 of the ENP and displayed 124.

If the input is a DIAL DISPLAY command 126, the PROGRAM mode is turned off and the telephone line 14 is seized 128 by the telephone device controller 10. The telephone device controller 10 then displays and dials the number stored in ENP RAM 20, 130. The ENP mode is then turned off 131 and the display is extinguished. The telephone number is maintained in the ENP RAM 20. At this point in the IDLE cycle, a jump is made that takes the program cycle of the telephone device controller 10 to the TALK cycle at point "A" of FIG. 4, explained below, 132.

If the telephone goes off hook 134, as when the telephone handset 12 is lifted out of its cradle or when the speaker phone is activated, IDLE mode is immediately ceased and the TALK cycle is initiated, 136.

If the PLAY key is pressed, 138, IDLE mode is immediately ceased and the PLAY cycle is initiated, 140.

If the PAUSE mode has been previously engaged, a timer (not shown) checks to see if five minutes have elapsed since the timer was started without any actions being taken by the user 142. If so, the timer is stopped and set to zero (so that the telephone device controller will not detect the passing of the five minutes again) and the telephone device controller 10 positions the incoming message tape of the TAD 18 to the end of its messages 144, to exit PAUSE mode 146, and to return to the main loop of IDLE mode.

Figure 4:
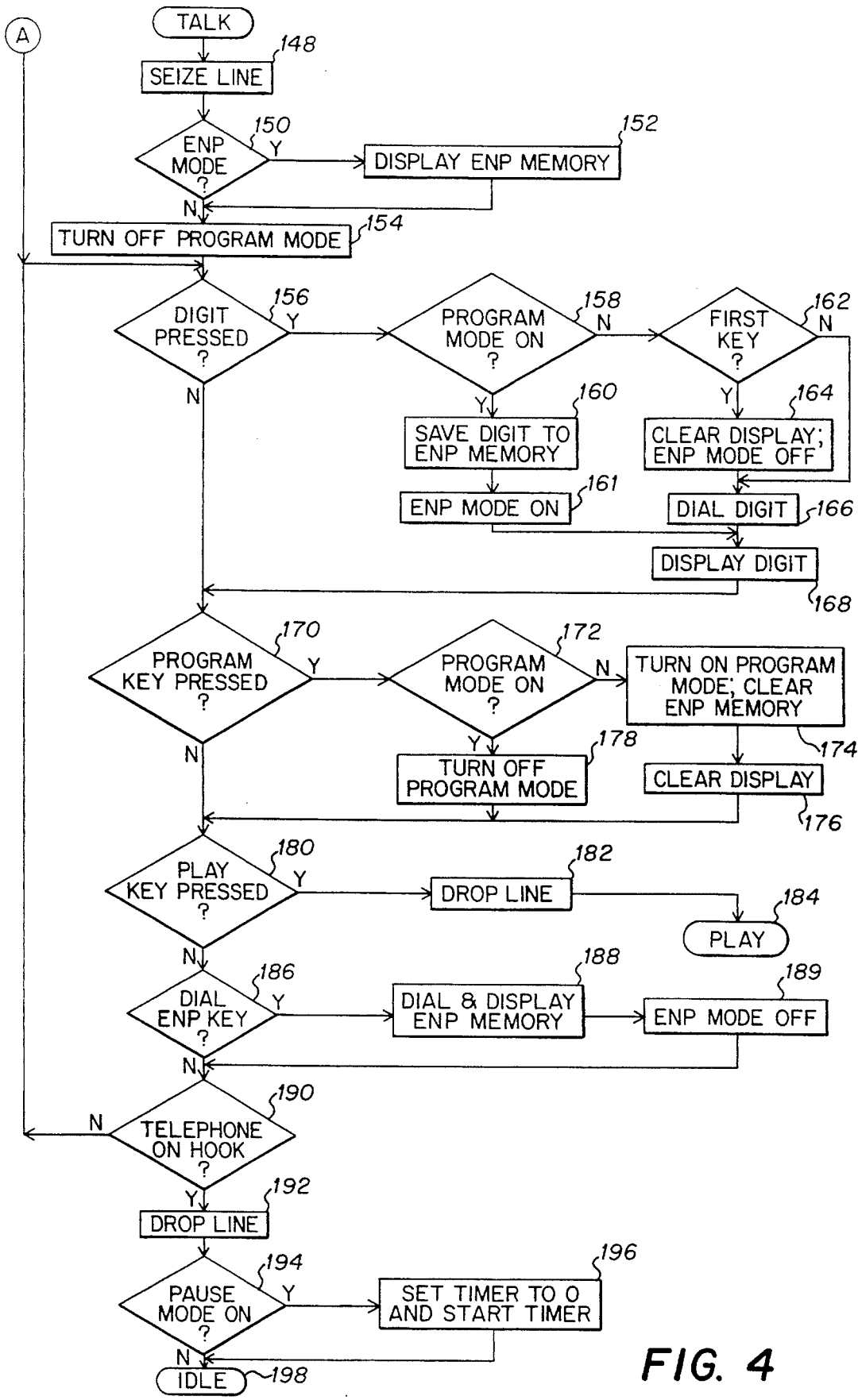
FIG. 4 is a flow chart portraying the function of the present invention when initially in TALK mode.
Figure 5:
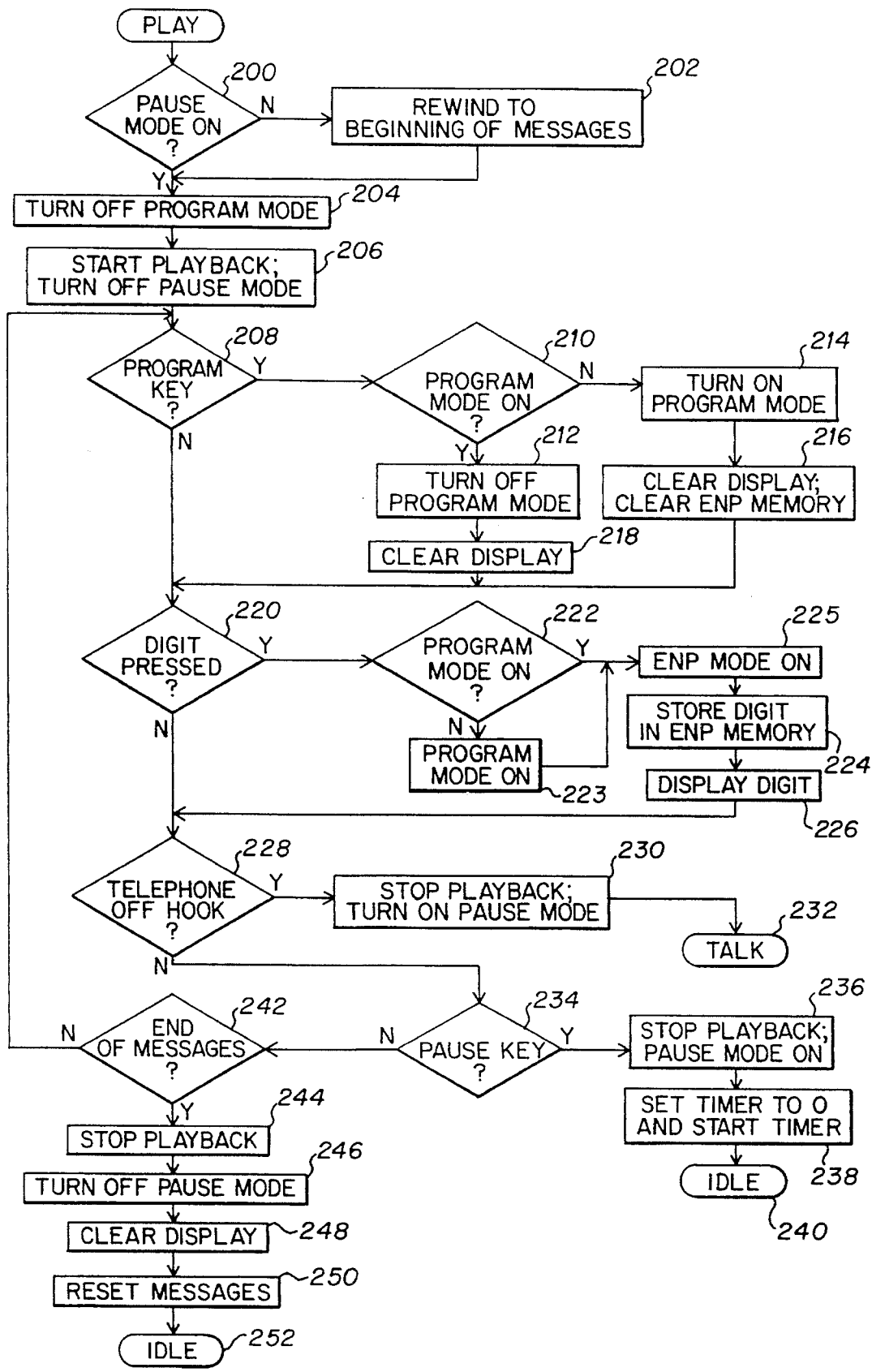
FIG. 5 is a flow chart portraying the function of the present invention when initially in PLAY mode.

As shown in FIG. 4, when the phone is off hook, as when the telephone handset 12 is removed from its cradle or when the speaker phone is activated, the TALK mode of the ENP is initialized so long as the DIAL DISPLAY command has not just been previously executed (where entry into TALK mode from IDLE mode is made at point "A", 132 of FIG. 3). Initially, the phone line 14 is seized 148 by the telephone device controller 10. If the ENP is in ENP mode 150, the number in ENP RAM 20 is displayed 152. The PROGRAM mode is then turned off 154. The main loop of the program is then entered into at Point "A" of the TALK program cycle.

If the user presses a digit 156, the telephone device controller 10 checks the PROGRAM mode to see if it is on 158. If the PROGRAM mode is on, the digit is saved in the ENP RAM 20, 160, and displayed by turning on the ENP mode 161. If the PROGRAM mode is off, the telephone device controller 10 checks to see if the digit is the first digit to be entered 162. If the digit is the first to be entered, the display 22 is cleared 164 and then the number is dialed 166 and displayed 168. If the digit is not the first to be entered, the number is dialed 166, then appended to the current display 168.

If the user presses the PROGRAM key 170, the PROGRAM mode is toggled 172–178. If the PROGRAM mode is off when the PROGRAM key is pressed, the ENP RAM 20 and display 22 are both cleared 174, 176 and prepared for input from the telephone device controller 10. If the PROGRAM mode is on when the PROGRAM key is pressed, the PROGRAM mode is turned off 178 and the TALK mode continues through its cycle.

If the PLAY key 36 is pressed 180, the telephone line connection is dropped 182 and control of the telephone device controller 10 is transferred to the PLAY mode cycle 184, explained below.

If the DIAL DISPLAY key 32 is pressed 186, the number in the ENP RAM 20 is displayed and dialed 188. Shortly thereafter, the ENP mode is turned off 189, extinguishing the display.

If while in TALK mode, the telephone device controller 10 detects that the phone is on-hook 190, that is the telephone handset 12 is in its cradle and the speaker phone is off, the telephone device controller 10 drops the line 14, 192 and checks to see if the PAUSE mode has been activated 194. If the PAUSE mode is on, an approximately 5 minute timer is set to zero and started 196 before control is turned over to IDLE mode 198. While in IDLE mode, the telephone device controller 10 checks the timer to see if the five minutes have elapsed without any other action being taken by the user 142 of FIG. 3. After the lapse of five minutes without any input, the timer is stopped and set to zero 144 (to prevent further affirmative responses when the timer is checked). The telephone device controller 10 then repositions the incoming message tape of TAD 18 to the end of the messages 144, turns off PAUSE mode 146, and continues through the main loop of IDLE mode as the device has been temporarily abandoned.

PLAY mode is the third of the three ENP modes. Upon entering PLAY mode, from pressing the PLAY key 36 in either from IDLE mode 140 or TALK mode 184, the telephone device controller 10 checks to see if the unit is in PAUSE mode 200. If the TAD 18 is not in PAUSE mode, the incoming message tape is rewound to the beginning so that the messages can be played back 202. If the unit is in PAUSE mode, then the incoming message tape is not rewound and playback of the incoming messages continues from the point at which it was last stopped. Before entering the main loop of the PLAY mode program, the PROGRAM mode is turned off 204, as is the PAUSE mode, and playback of the incoming message tape is started 206.

The main program loop of the PLAY mode first checks the PROGRAM key 30 to see if it has been pressed 208. If the PROGRAM key 30 has been pressed, the PROGRAM mode is toggled 210–214 and the display 22 is cleared 216, 218. If the PROGRAM mode is turned on, the ENP RAM 20 is cleared 216 and then ready to receive input from the telephone device controller 10 and store the telephone number.

If the user presses a numeric digit while in PLAY mode 220, the unit checks to see if the PROGRAM mode is on 222. If the PROGRAM mode is off, it is turned on 223 and the program continues as if the PROGRAM mode was on when the digit was pressed. If the PROGRAM mode is on, then ENP mode is turned on 225 to display the current contents of the ENP RAM 20 when the telephone is off-hook. The digit is then stored 224 in the ENP RAM 20, and displayed 226.

The PLAY mode then checks to see if the phone has gone off hook 228. If not, the program continues and checks for other inputs and device states. If the phone has gone off hook playback of the incoming messages is stopped and PAUSE mode is turned on 230. Control is turned over to TALK mode 232 and telephone calls can then be made through the telephone handset 12 or the speaker phone and the user will not lose his position on the incoming message tape.

If the PAUSE key is pressed 234, the telephone device controller 10 stops the incoming message tape while the PAUSE mode is engaged 236. A five minute timer is then set to zero and triggered 238 by the telephone device controller 10 and program control is transferred to IDLE mode 240. If after five minutes in IDLE mode, the unit has been undisturbed and is still in PAUSE mode, the telephone device controller 10 assumes that the unit has been temporarily abandoned as the timer then affirms that five minutes have elapsed 142 of FIG. 3. The timer is stopped and set to zero 144, the incoming message tape is wound to the end of the last message recorded 144, and the PAUSE mode is turned off 146. The unit awaits further input by proceeding through the main IDLE mode loop.

If the TAD 18 reaches the end of the messages left on the incoming message tape, an end of message signal notifies the telephone device controller 10 that there are no more messages on the tape 242. The telephone device controller 10 then stops the incoming message tape 244 and checks the PAUSE mode to make sure that it is off 246. If the PAUSE mode is on, the telephone device controller 10 turns it off. The display 22 is then cleared 248 and the incoming message tape is rewound to the beginning 250 before the telephone device controller 10 transfers control of the unit to the IDLE sequence 252.

Figure 6:
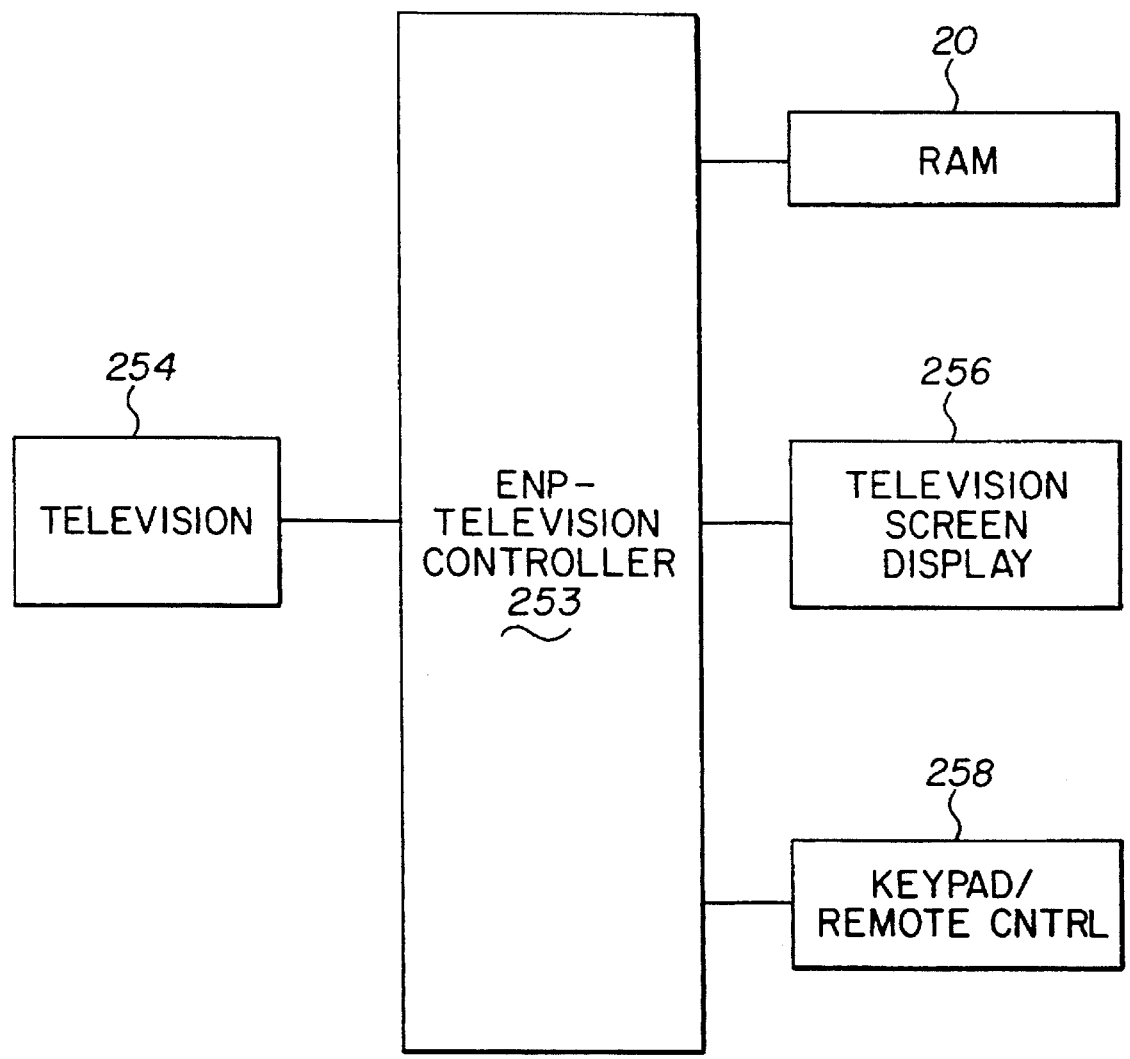
FIG. 6 is a schematic diagram portraying the present invention as connected to a television.

When used in a television, as shown in FIG. 6, the ENP works in much the same way as when used with a phone. An ENP-television controller 253 is connected to a television 254, the television viewing screen 256, a source of ENP RAM 20, and a keypad/remote control unit 258. The keypad/remote control unit is similar to the keypad for FIG. 2 save that a TAD 18 is not being controlled and a television 254 rather than a telephone is being controlled. The ENP-television controller 253 constantly scans its connection to the keypad/remote control unit 258. A command to PROGRAM the ENP RAM 20 must be sent by the user and detected by the ENP-television controller 253 before it stores a number in the ENP RAM 20. Upon detection of a PROGRAM command, the ENP-television controller 253 stores the numbers following the command in the ENP RAM 20 and displays the digits entered on the television screen 256. Numbers are stored and displayed by the ENP-television controller 253 so long as numbers are entered. A short delay following the entry of the last number signals the end of transmission of numbers to the ENP-television 253. The number is then removed from the television display 256. The number may be displayed at the bottom of the television screen 256 while a television program is also being displayed. When the user wants to see the number again, a DISPLAY ENP key (not shown) is pressed on the keypad/remote control. The ENP-television controller 253 then recalls the number in ENP RAM 20 and displays it at the screen bottom 256. When coupled with a television set 254, the ENP is conveniently used when a number is displayed on the television screen 256. The user can then PROGRAM the ENP RAM 20 with the number displayed, thus saving it for future use. The ENP-television controller 253 may also function as a television/VCR controller that takes commands from the keypad/remote controller 258.

While the present invention has been described with regards to particular embodiments, it is recognized that additional variations of the present invention may be devised without departing from the inventive concept. These include using a PROGRAM key on a telephone device to signal other functions besides just ENP number storage.

What is claimed is:

1. A combined electronic notepad and telephone answering device, for use in combination with a telephone, the combined electronic notepad and telephone answering device comprising:

message storing means for storing at least incoming voice messages;

message playback means for playing back stored voice messages which were stored in said message storing means;

a numeric keypad for entering at least numbers;

a dialer coupled to said numeric keypad for at least dialing numbers entered through said numeric keypad;

a memory coupled to said numeric keypad and to said dialer for storing numbers entered through said numeric keypad, the numbers stored in said memory being selectively dialable by said dialer; and a controller coupled to said memory and to said dialer for controlling operations of said message storing means and said message playback means, and for also controlling operations of said dialer, said controller including:

means operable during playing back of a previously recorded voice message by said message playback means for automatically storing a number entered by said numeric keypad, into said memory, for later dialing of said stored number by said dialer;

pause means for causing playback of a voice message, stored in said message storage means, to be paused in response to said telephone going to an off hook state regardless of whether or not there is an incoming telephone call; and pause ending means for ending said pause and for resuming playing back of said voice message from said message storage means, in response to said telephone going to an on hook state from an off hook state.

2. The combined electronic notepad and telephone answering device of claim 1, further comprising a display coupled to said memory for displaying at least a portion of a group of numbers stored in said memory for visual inspection of said stored numbers.

3. The combined electronic notepad and telephone answering device of claim 2, wherein said display comprises a liquid crystal display.

4. The combined electronic notepad and telephone answering device of claim 1, wherein said dialer comprises an automatic dialer for storing a plurality of telephone numbers for selectable dialing by a user.

5. The combined electronic notepad and telephone answering device of claim 1, wherein said memory comprises a random access memory (RAM).

6. The combined electronic notepad and telephone answering device of claim 1, wherein said controller comprises a microprocessor.

7. The combined electronic notepad and telephone answering device of claim 1, further comprising means for connecting said numeric keypad and said dialer to a telephone line.

8. The combined electronic notepad and telephone answering device of claim 1, further comprising a key for manually setting said memory to a storage mode, for storing numbers entered by a user via said numeric keypad.

9. The combined electronic notepad and telephone answering device of claim 8, further comprising a key for actuating said dialer to cause dialing of a stored number.

10. The combined electronic note pad and telephone answering device of claim 1, wherein said pause means further comprises a manually operable pause key, and wherein manual operation of said pause key by a user causes said pause means to at least pause playing back of a voice message responsive to operation of said pause key.

11. The combined electronic notepad and telephone answering device of claim 1, wherein said controller enables a telephone number to be dialed during said pause by said dialer.

12. The combined electronic notepad and telephone answering device of claim 1, wherein said controller enables a telephone number to be stored in said memory without dialing during said pause.

* * * * *